US006641954B2

(12) United States Patent
Weerts et al.

(10) Patent No.: US 6,641,954 B2
(45) Date of Patent: Nov. 4, 2003

(54) BATTERY SEPARATOR WITH MUD REST PROTECTORS

(75) Inventors: Daniel E. Weerts, Corvallis, OR (US); Gregory T. Humphrey, Eugene, OR (US)

(73) Assignee: Entek International LLC, Lebanon, OR (US)

( * ) Notice: Subject to any disclaimer, the term of this patent is extended or adjusted under 35 U.S.C. 154(b) by 0 days.

(21) Appl. No.: 10/383,316

(22) Filed: Mar. 7, 2003

(65) Prior Publication Data

US 2003/0186126 A1 Oct. 2, 2003

Related U.S. Application Data

(60) Provisional application No. 60/368,553, filed on Mar. 29, 2002.

(51) Int. Cl.$^7$ .............................................. H01M 10/06
(52) U.S. Cl. ........................................ 429/225; 429/143
(58) Field of Search ................................ 429/129, 130, 429/132, 138, 142, 143, 225, 228

(56) References Cited

U.S. PATENT DOCUMENTS

| 4,026,000 A | 5/1977 | Anderson | 29/730 |
| 4,963,444 A | 10/1990 | Delaney | 429/67 |
| 5,096,787 A | 3/1992 | Delaney et al. | 429/81 |
| 5,679,479 A | 10/1997 | Young et al. | 429/147 |
| 5,789,103 A | 8/1998 | Young et al. | 429/147 |

OTHER PUBLICATIONS

Microporous Polyethylene Separator Spec Sheet for Project 45–6–640 RS, Entek International LLC, first public distribution to customers in 2000.
Microporous Polyethylene Separator Spec Sheet for Product 35–6–640 RS, Entek International LLC, first public distribution to customers in 2000.

*Primary Examiner*—Randy Gulakowski
*Assistant Examiner*—Monique Wills
(74) *Attorney, Agent, or Firm*—Stoel Rives LLP

(57) ABSTRACT

A battery separator for use in a flooded cell-type lead acid battery includes a separator that is wrapped around an electrode to form an enveloped electrode that is placed in a cell compartment having mud rests that separate mud deposited from the enveloped electrode so that the incidence of battery failure is minimized. The battery separator of the present invention includes (1) major ribs that provide the proper electrode spacing and a space in which free electrolyte resides and (2) submini-ribs patterned to prevent the separator backweb from rubbing against the mud rests and forming a hole. The resulting economically efficient battery assembly exhibits increased durability and compression resistance.

19 Claims, 4 Drawing Sheets

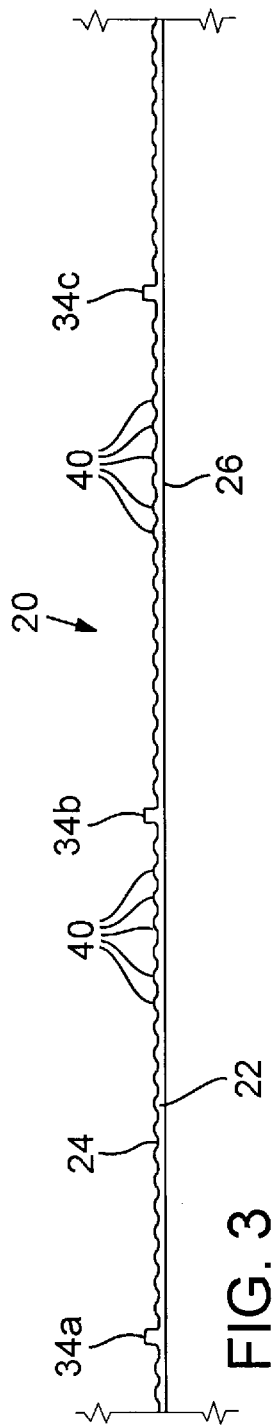
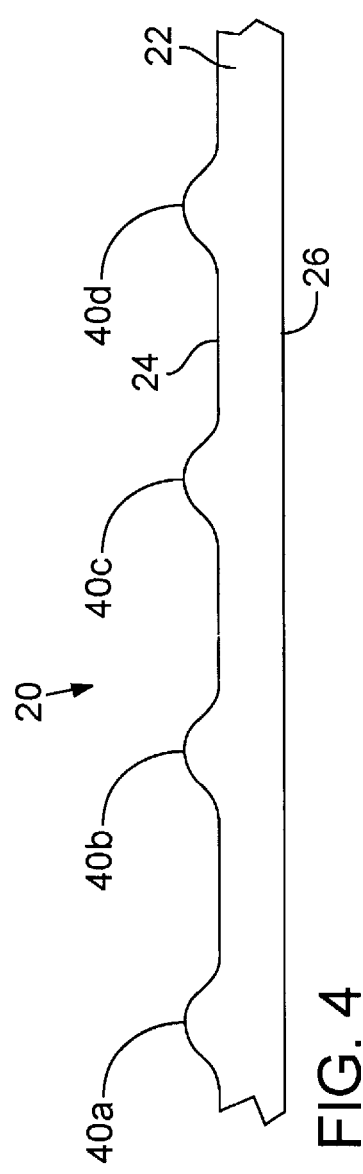
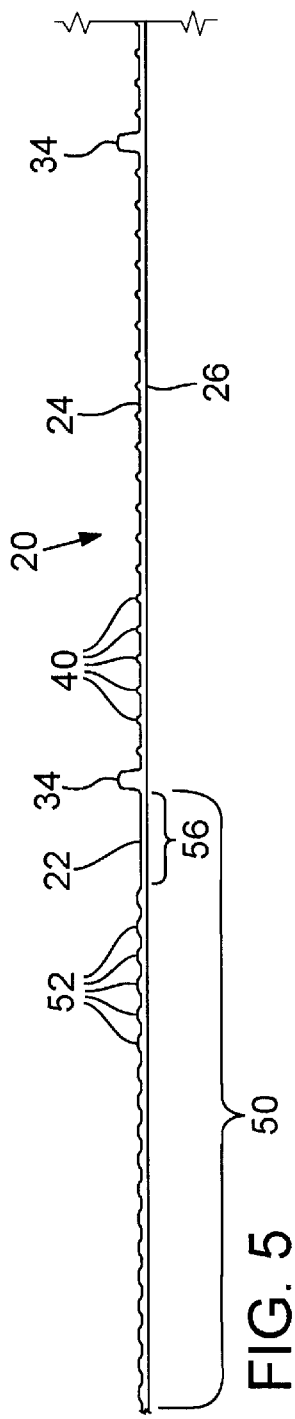
FIG. 3
FIG. 4
FIG. 5

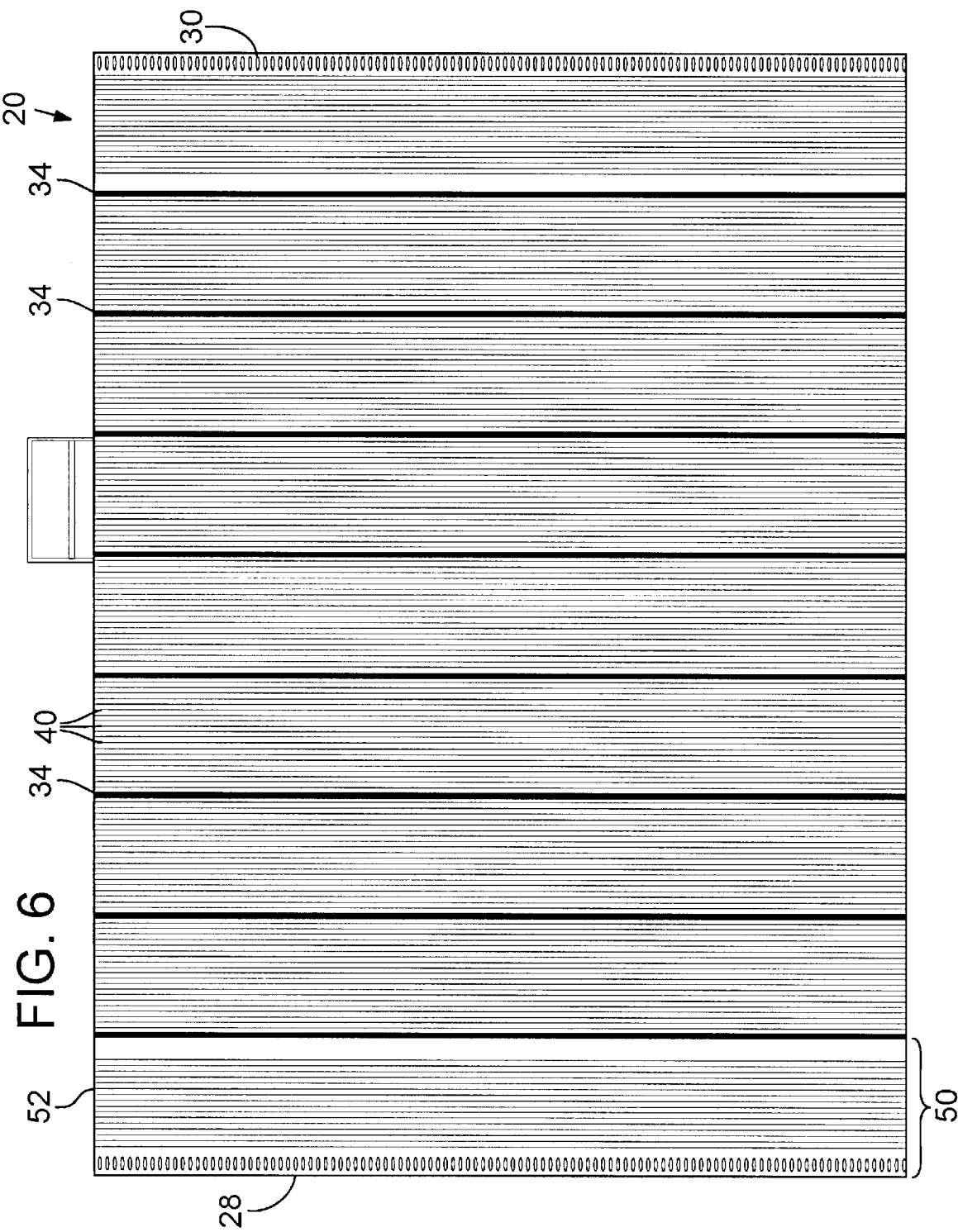

BATTERY SEPARATOR WITH MUD REST PROTECTORS

RELATED APPLICATION

This application claims priority from U.S. Provisional Patent Application No. 60/368,553, filed Mar. 29, 2002.

COPYRIGHT NOTICE

©2003 Entek International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

1. Technical Field

This invention relates to a battery separator for use in a flooded cell-type lead acid battery and to a method for making such a separator.

2. Background of the Invention

In a flooded cell-type lead acid battery, the positive and negative electrodes are separated by a battery separator. Such separators are formed of materials that are sufficiently porous to permit the electrolyte of the battery to reside in the pores of the separator material, thereby permitting ionic current flow between adjacent positive and negative plates, but not so porous to allow physical contact between the electrodes or "treeing" of lead between adjacent electrodes.

The battery separator currently used by most flooded cell-type lead acid battery manufacturers includes microporous polyethylene. This type of separator is composed of an ultrahigh molecular weight polyethylene, a filler (typically amorphous silica), a plasticizer (typically a processing oil), and certain minor ingredients such as an antioxidant, a lubricant, and carbon black.

Microporous polyethylene separator material is commercially manufactured by passing the ingredients through a heated extruder, passing the extrudate generated by the extruder through a die and into a nip formed by two heated calender rolls to form a continuous web. The continuous web is processed by extracting a substantial amount of the processing oil from the web using a solvent, drying the extracted web, slitting the web into lanes of predetermined width, and winding the lanes into rolls.

Until recently, separators were manufactured as sheets that were placed between stacked electrodes. It is now more common to wrap a separator around the negative or positive electrode and seal the separator, which has a width greater than that of the electrodes in pre-wrapped condition. Sealing is performed along both edges to form an "envelope" around each electrode. The enveloped electrodes are stacked, either against one another or in an alternating pattern with unenveloped electrodes. The resulting stack is then compressed and inserted into the cell compartment of a battery case. FIGS. 1 and 2 are top views of, respectively, an empty cell compartment 10 and an open-ended enveloped electrode 12 placed within cell compartment 10. While cell compartment 10 can be made of any material known in the art, the cell compartment shown in FIGS. 1 and 2 is made of polyethylene plastic.

Typically such separators are manufactured to have multiple "major" ribs extending from at least one planar face of the backweb of the separator. The major ribs function to provide proper electrode spacing and to provide a space in which free electrolyte can reside. The major ribs are typically formed parallel to the longitudinal edges of the backweb and generally have a height above the backweb that is greater than the thickness of the backweb. The ribs may be formed in one of several ways: (1) the ribs can be formed integrally with the backweb; (2) the ribs can be subsequently applied to the backweb as a bead of the same material as or different material from that of the backweb; or (3) the ribs can be formed by embossing the backweb.

However, because the major ribs have a greater volume than a portion of the backweb occupying the same planar surface area, more processing oil remains in the major ribs during the extraction step than that which remains in the backweb, resulting in undesirably increased electrical resistance. Further, separators having major ribs are more expensive to manufacture in light of the additional separator material that is incorporated into the major ribs.

One approach to remedying these problems entailed forming submini-ribs between the major ribs. This allowed separator manufacturers to reduce the number of major ribs and thereby decrease manufacturing costs. By reducing the number of major ribs, the amount of processing oil that remained in the separator after extraction was reduced, thereby decreasing the electrical resistance of the separator. Further, the submini-ribs facilitated the production of a thinner backweb with no loss in compression resistance or separator support. The use of a thinner backweb further reduced the manufacturing costs and the overall electrical resistance of the separator.

Separators also help to hold the electrochemically active paste on the wire grids of the electrodes during battery operation. Although separators serve to limit the amount of electrode paste that falls to the bottom of the cell compartment, operational vibrations of certain batteries (car batteries, for example) are so violent that a significant amount of paste naturally falls off the electrodes and pools on the bottom of the cell compartment. While on the bottom of the cell compartment, the electrode paste reacts with other chemicals that rest there, forming what is referred to as "mud." Mud typically includes residual sulfuric acid, lead sulfate, PbO, and $PbO_2$. The accumulation of mud in the bottom of the cell compartment causes battery failure because the lower portion of each electrode makes contact with the accumulated mud, causing the battery to short-circuit.

One attempt to remedy this problem entailed adding mud rests to the bottom of the cell compartment. As shown in FIGS. 1 and 2, mud rests 14 are U-shaped planar members that extend along and upward from the bottom surface 16 of cell compartment 10, thereby separating from the enveloped electrodes the paste residue that falls from the electrodes and pools on the bottom of cell compartment 10. Mud rests 14 typically extend across the battery from wall to wall, although they may be staggered.

Although the mud rests prevent the enveloped electrodes from contacting the mud, the mud rests are typically of a thickness that allows a single mud rest to lie adjacent to the separator backweb between two adjacent submini-ribs. Upon assembly or during operation, the sharp-cornered mud rests nib against the backweb, creating one or more wear areas that ultimately develop into one or more holes in the separator. Over time, these holes cause the battery to short-circuit.

Although major and submini-ribs and mud rests are integral parts of separator technology, their combined use in a single, economically efficient, operational battery has not been successfully achieved. This invention addresses the desire to fabricate a separator for use in a flooded cell-type lead acid battery having mud rests.

SUMMARY OF THE INVENTION

An object of the present invention is, therefore, to provide an economically efficient separator having (1) major ribs that provide the proper electrode spacing and a space in which free electrolyte can reside and (2) submini-ribs that reduce the manufacturing costs and the electrical resistance of the separator. The separator envelops an electrode and is placed into a cell compartment having mud rests that separate the mud from the enveloped electrode so that the incidence of battery failure is minimized.

The separator of the present invention includes multiple major and submini-ribs that are patterned such that the predominant web structure that rests against the mud rests at the bottom of the cell compartment are the submini-ribs. In most prior art separators, the backweb of the separator rubbed against the mud rests, which eventually resulted in the formation of a wear area, and over time, a hole in the separator. In contrast, predominantly the submini-ribs, which are thicker than the backweb, contact the mud rests in the present invention. Thus the formation of a wear area, and eventually one or more holes, in the separator is significantly delayed. Because increasing the number of submini-ribs and decreasing the number of major ribs results in a decrease in manufacturing costs, the placement and number of the major ribs is modified to provide a cost-effective, highly reliable separator for use in a flooded cell-type battery containing mud rests.

Additional objects and advantages of this invention will be apparent from the following detailed description of preferred embodiments thereof which proceeds with reference to the accompanying drawings.

BRIEF DESCRIPTION OF THE DRAWINGS

FIG. 3 is a fragmentary side elevation view of one embodiment of the separator of the present invention.

FIG. 4 is an enlarged side elevation view of a portion of the separator of FIG. 3.

FIG. 5 is a fragmentary side elevation view of an implementation of the embodiment shown in FIG. 3 including a shoulder region and mini-ribs.

FIG. 6 is a diagram showing the separator of the present invention enveloping an electrode.

DETAILED DESCRIPTION OF PREFERRED EMBODIMENTS

Figure 1:
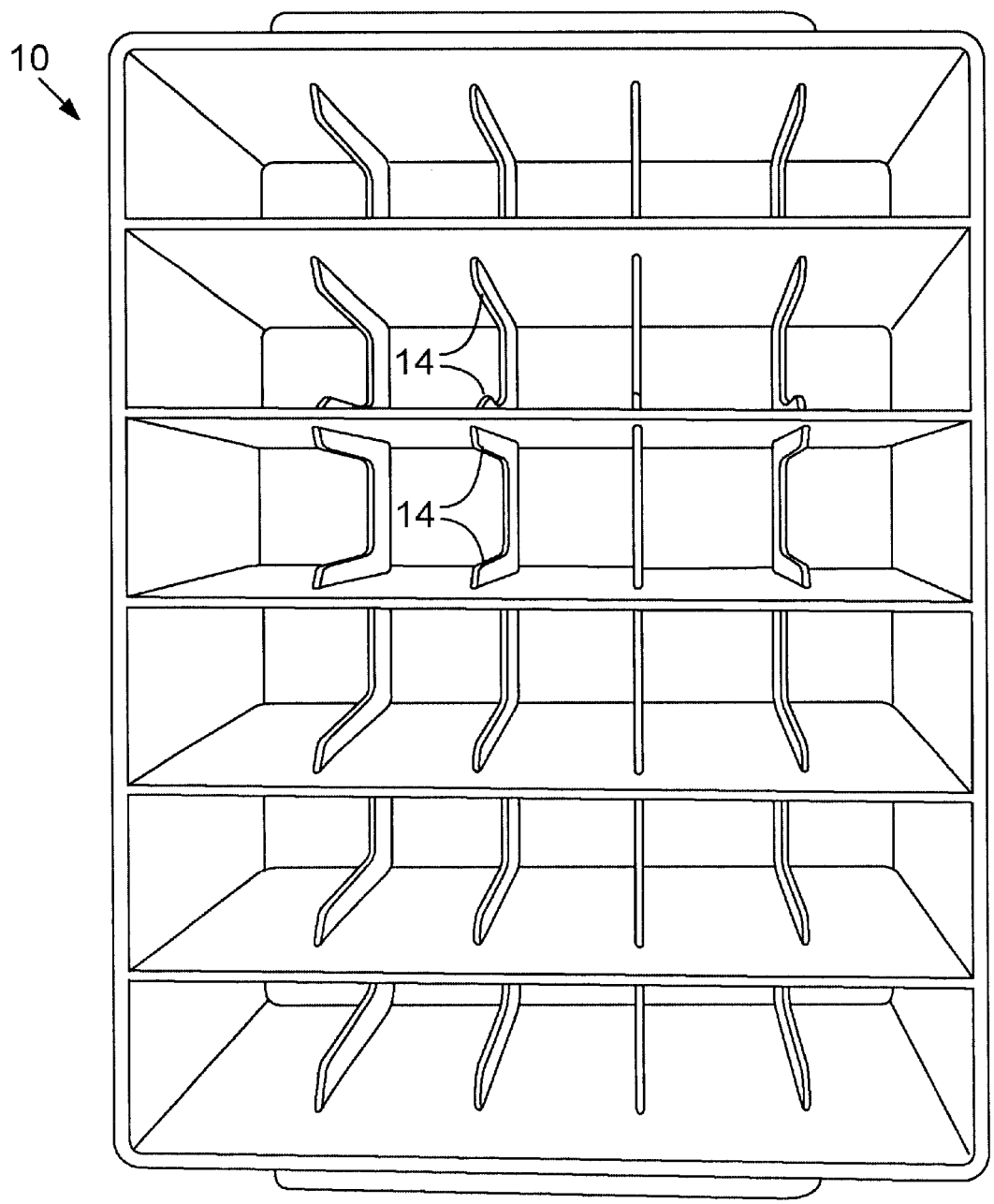
FIG. 1 is a diagram showing the bottom portion of the cell compartment.
Figure 2:
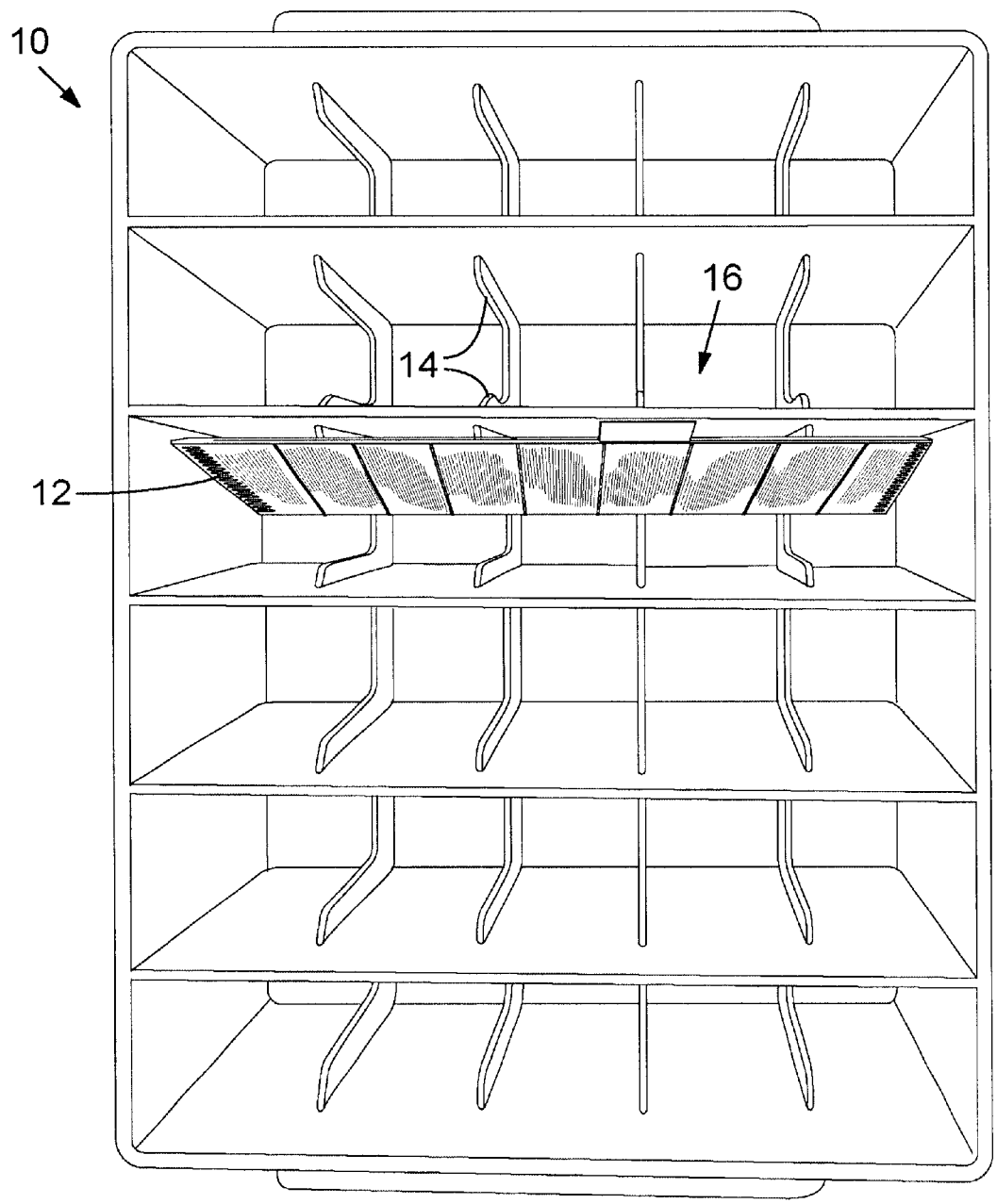
FIG. 2 is a diagram showing the bottom portion of the cell compartment into that has been placed an enveloped but unsealed electrode.

As shown in FIG. 3, a battery separator 20 of this invention is comprised of a backweb 22 having a first (upper) planar surface 24, a second (lower) planar surface 26, and respective first and second longitudinal edges 28 and 30 (shown in FIG. 6) that are parallel to each other. The width of the separator of this invention can be any width desired by battery manufacturers. Typical separator widths are between about 115 mm and about 170 mm. The thickness of backweb 22 is typically between about 0.05 mm and about 0.20 mm.

Multiple major ribs 34a–34c project from upper planar surface 24 of separator 20. Major ribs 34 are disposed in the longitudinal direction of separator 20, are positioned substantially parallel to longitudinal edges 28 and 30, and may have any cross-sectional configuration used in the art. Major ribs 34 are typically parallel to one another and to edges 28 and 30, but may be inclined at an angle to edges 28 and 30 (i.e., be diagonally disposed), or may be sinusoidal rather than straight. Major ribs 34 project above upper planar surface 24 of backweb 22 a height of between about 0.50 mm and about 1.5 mm. The number of major ribs provided on a separator sheet varies according to the battery specifications; however, a preferred embodiment includes eight major ribs for each separator sheet. The distance between adjacent major ribs 34 is typically between about 10 mm and about 25 mm.

Submini-ribs 40 are longitudinally disposed along the length of separator 20, and adjacent ones of them are substantially evenly spaced from each other. Submini-ribs 40 preferably extend from only one planar face of separator 20 and are preferably disposed substantially parallel to each other and to edges 28 and 30. However, submini-ribs 40 may have other configurations, such as inclined at an angle to edges 28 and 30 or being sinusoidal rather than straight. Submini-ribs 40 preferably have rounded apexes, as shown in FIG. 4. The height of submini-ribs 40 above upper planar surface 24 is selected in accordance with the desired height of major ribs 34 and the desired compression resistance, but is preferably between about 0.025 mm and about 0.125 mm, and is most preferably about 0.08 mm.

There are preferably 20 submini-ribs 40 provided between adjacent major ribs 34. The distance between adjacent submini-ribs is preferably between about 0.75 mm and about 0.96 mm, most preferably about 0.825 mm. Adjacent submini-ribs 40 are preferably uniformly spaced apart.

Major ribs 34 and submini-ribs 40 are patterned such that only submini-ribs 40 of the separator-enveloped electrodes rest against mud rests 14 at the bottom of cell compartment 10. In most prior art separators, the backweb of the separator rubbed against mud rests 14, which eventually resulted in the formation of a wear area, and over time, holes in the separator. In the separator of the present invention, only submini-ribs 40, which are thicker than backweb 22, contact mud rests 14. Thus the formation of a wear area, and eventually one or more holes, in separator 20 is significantly delayed.

Shoulder regions 50 are located between the last major ribs 34 and edges 28 and 30 of the separator, as shown in FIG. 5. Shoulder region 50 is the area in which separator 20 is sealed to form an enveloped electrode. The electrodes positioned adjacent to the separator sheets often have sharp metal protrusions called "bent wires" that can abrade and puncture the adjacent separator, thereby causing a short circuit and premature failure of the battery. Thus shoulder regions 50 are constructed to be more durable and puncture-resistant than the other portions of separator 20. Consequently, most shoulder regions include multiple mini-ribs 52. Further, an unribbed region 56 having a length between about 3.0 mm and 3.5 mm is preferably provided between mini-ribs 52 and major rib 34. Unlike submini-ribs 40, mini-ribs 52 have flattened upper surfaces, and the maximum preferred spacing between adjacent mini-ribs 52 is about 0.563 mm. Mini-ribs 52 are preferably longitudinally disposed, and substantially evenly spaced along the length of separator 20. Mini-ribs 52 are preferably disposed substantially parallel to one another and to longitudinal side edges 28 and 30, but may have other configurations, such as inclined at an angle to longitudinal side edges 28 and 30, or being sinusoidal rather than straight. Although they preferably extend from only one of planar surfaces 24 and 26, mini-ribs 52 may extend from both planar surfaces in shoulders region 50, and may be staggered so that a mini-rib on one planar surface is located between two mini-ribs located on the other planar surface. While mini-ribs 52 are not necessary to the present invention, their presence greatly increases the strength and durability of the shoulder region and thereby decreases the incidence of short-circuiting and premature battery failure.

A first exemplary microporous polyethylene battery separator of the present invention was made having the following characteristics, all dimensions being in millimeters:

| | |
|---|---|
| Separator width: | 162.56 |
| Backweb thickness: | 0.15 |
| Major ribs: | |
| Number: | 8 |
| Height: | 0.61 |
| Width: | 0.38 |
| Spacing: | 18.14 |
| Submini-Ribs: | |
| Number: | 20 (between adjacent major ribs) |
| Height: | 0.08 |
| Width: | 0.25 |
| Spacing: | 0.86 |
| Mini-Ribs: | |
| Number: | 18 (on each shoulder) |
| Height: | 0.10 |
| Width: | |
| Width from Slope to Slope: | 0.29 |
| Width of the Flat Apex: | 0.25 |
| Spacing: | 0.17 |
| Shoulder Length: | 17.78 (from last major rib to end of sheet) |

A second exemplary microporous polyethylene battery separator of the present invention was made having the following characteristics, all dimensions being in millimeters:

| | |
|---|---|
| Separator width: | 162.56 |
| Backweb thickness: | 0.15 |
| Major ribs: | |
| Number: | 8 |
| Height: | 0.48 |
| Width: | 0.38 |
| Spacing: | 18.14 |
| Submini-Ribs: | |
| Number: | 20 (between adjacent major ribs) |
| Height: | 0.08 |
| Width: | 0.15 |
| Spacing: | 0.86 |
| Mini-Ribs: | |
| Number: | 18 (on each shoulder) |
| Height: | 0.10 |
| Width: | |
| Width from Slope to Slope: | 0.29 |
| Width of the Flat Apex: | 0.25 |
| Spacing: | 0.17 |
| Shoulder Length: | 17.78 (from last major rib to end of sheet) |

A third exemplary microporous polyethylene battery separator of the present invention was made having the following characteristics, all dimensions being in millimeters:

| | |
|---|---|
| Separator width: | 162.56 |
| Backweb thickness: | 0.15 |
| Major ribs: | |
| Number: | 8 |
| Height: | 0.73 |
| Width: | 0.38 |
| Spacing: | 18.14 |
| Submini-Ribs: | |
| Number: | 20 (between adjacent major ribs) |
| Height: | 0.08 |
| Width: | 0.15 |
| Spacing: | 0.86 |
| Mini-Ribs: | |
| Number: | 18 (on each shoulder) |
| Height: | 0.10 |
| Width: | |
| Width from Slope to Slope: | 0.29 |
| Width of the Flat Apex: | 0.25 |
| Spacing: | 0.17 |
| Shoulder Length: | 17.78 (from last major rib to end of sheet) |

A further advantage obtained in using the separator of the present invention is a reduction in or elimination of rib bending and/or flattening. In assembling a battery, the number of alternating enveloped and unenveloped electrodes required to form a cell are stacked together, compressed, and inserted into a cell compartment of a battery case. The compressive forces to which the separators are subjected can cause undesirable rib bending and/or flattening with conventional rib construction, especially at higher "overall" dimensions, i.e., rib heights. The rib configuration of the present invention reduces or eliminates such rib bending and/or flattening.

The use of submini-ribs 40 to provide higher major rib height without loss of compression resistance also allows the separators to be made with thinner backwebs, resulting in a consequent savings in the amount of material required to make a separator product of a specified square footage.

Although the separator of the invention is illustrated as having major ribs 34 extending from only upper planar surface 24 of the backweb 22, the invention is intended to include a separator in which major ribs 34 are formed on both upper and lower planar surfaces 24 and 26. Where major ribs 34 extend from both planar surfaces of separator 20, the height of major ribs 34 above upper and lower planar surfaces 24 and 26 may be the same as, greater than, or lesser than the height of the major ribs on the other planar surface.

Although the separator of the invention is illustrated as having submini-ribs 40 extending from only upper planar surface 24 of the backweb 22, the invention is intended to include a separator in which submini-ribs 40 are formed on both upper and lower planar surfaces 24 and 26. Where submini-ribs 34 extend from both planar surfaces of separator 20, the height of submini-ribs 34 above upper and lower planar surfaces 22 and 26 of backweb 24, may be the same may be the same as, greater than, or lesser than the height of the submini-ribs on the other planar surface.

Although the separator of the invention is illustrated as having mini-ribs 52 extending from only upper planar surface 24 of the backweb 22, the invention is intended to include a separator in which mini-ribs 52 are formed on both upper and lower planar surfaces 24 and 26. Where mini-ribs 52 extend from both planar surfaces of separator 20, the height of mini-ribs 52 above upper and lower planar surfaces 24 and 26 may be the same as, greater than, or lesser than the height of the mini-ribs on the other planar surface.

Although the invention has been described relative to forming ribs in a microporous polyethylene separator, because this is the principal type of separator material currently used by flooded cell-type lead acid battery manufacturers, any separator material which is porous, acid resistant, and capable of being permanently embossed may be used. These materials may be generally characterized as filled or unfilled films and nonwoven webs of thermoplastic or thermoset polymers. Suitable thermoplastic polymers include polymers and copolymers of ethylene, propylene, butylene, vinyl chloride, and styrene. Suitable thermoset compositions include phenolics, ethylene/propylene/diene, isoprene, butadiene, styrene, and similar thermosetting polymers.

It will be obvious to those having skill in the art that many changes may be made to the details of the above-described embodiments of this invention without departing from the underlying principles thereof.

What is claimed is:

1. A porous, acid-resistant battery separator for use in a lead acid battery having a cell compartment that includes planar mud rests that extend along and upward from the bottom of the cell compartment, the planar mud rests configured to prevent contact between an electrode and a mud precipitate that is formed during operation of the lead acid battery and that accumulates at the bottom of the cell compartment, the battery separator comprising:

a backweb having an upper planar surface and a lower planar surface separated by a backweb thickness;

multiple spaced-apart major ribs extending a major rib height above the backweb and longitudinally disposed along the length of one of the upper planar surface or the lower planar surface to facilitate electrode spacing and to provide a space in which an electrolyte can reside;

multiple submini-ribs extending a submini-rib height above the backweb and longitudinally disposed along the length of one of the upper planar surface or the lower planar surface such that a number of the multiple submini-ribs are positioned between adjacent major ribs, the submini-ribs having a submini-rib thickness that is greater than the backweb thickness, the submini-rib thickness and the number of and spacing between ones of the submini-ribs positioned between adjacent major ribs cooperating to cause the submini-ribs to be a primary point of contact between the battery separator and the mud rests and thereby to delay the formation of a wear area in the battery separator during operation of the lead acid battery.

2. The battery separator of claim 1, in which the submini-ribs are longitudinally disposed along the length of both the upper planar surface and the lower planar surface.

3. The battery separator of claim 1, in which the backweb further includes opposed longitudinal edges that are in parallel alignment with the submini-ribs.

4. The battery separator of claim 1, in which the backweb further includes opposed longitudinal edges and in which the submini-ribs are positioned at an angle to the opposed longitudinal edges.

5. The battery separator of claim 1, in which adjacent sub-mini ribs are mutually spaced apart by a distance that is between about 0.75 mm to about 0.96 mm.

6. The battery separator of claim 1, in which the submini-rib height is between about 0.025 mm to about 0.125 mm.

7. The battery separator of claim 1, in which the submini-ribs include rounded apexes.

8. The battery separator of claim 1, in which the backweb thickness is between about 0.05 mm and about 0.20 mm.

9. The battery separator of claim 1, in which the submini-ribs have a submini-rib width that is between about 0.10 mm and about 0.30 mm.

10. The battery separator of claim 1, in which the major ribs are longitudinally disposed along the length of both the upper planar surface and the lower planar surface.

11. The battery separator of claim 1, in which the backweb further includes opposed longitudinal edges that are in parallel alignment with the major ribs.

12. The battery separator of claim 1, in which the backweb further includes opposed longitudinal edges and in which the major ribs are positioned at an angle to the opposed longitudinal edges.

13. The battery separator of claim 1, in which adjacent major ribs are spaced apart a distance between about 10 mm to about 25 mm.

14. The battery separator of claim 1, in which the major rib height is between about 0.5 mm to about 1.5 mm.

15. The battery separator of claim 1, in which between fifteen and twenty-five submini-ribs lie between adjacent major ribs.

16. The battery separator of claim 1, further including a shoulder region positioned between a terminal major rib and one of two opposed longitudinal edges, the shoulder region having increased puncture resistance and including multiple mini-ribs.

17. The battery separator of claim 16, in which the distance between adjacent mini-ribs is between about 0.45 mm and about 0.60 mm.

18. The battery separator of claim 16, in which the mini-ribs include flattened upper surfaces.

19. The battery separator of claim 16, in which the mini-ribs are positioned on both the upper planar surface and lower planar surface of the backweb.

* * * * *